Figure 1:
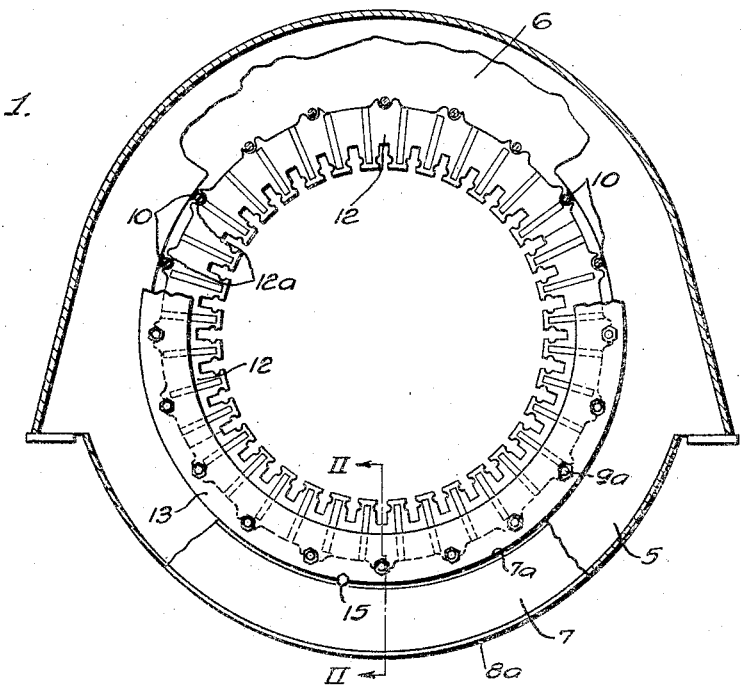

March 14, 1933.   R. A. McCARTY   1,901,315
FABRICATED FRAME
Filed May 27, 1929   2 Sheets-Sheet 1

INVENTOR
Roy A. McCarty.
BY
ATTORNEY

March 14, 1933.   R. A. McCARTY   1,901,315
FABRICATED FRAME
Filed May 27, 1929   2 Sheets-Sheet 2
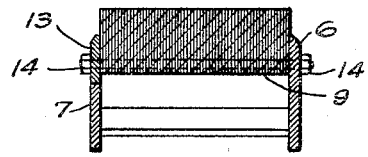
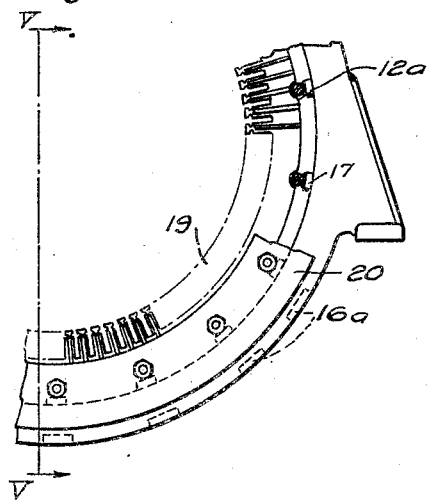
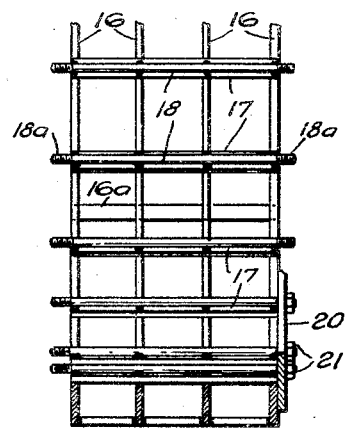
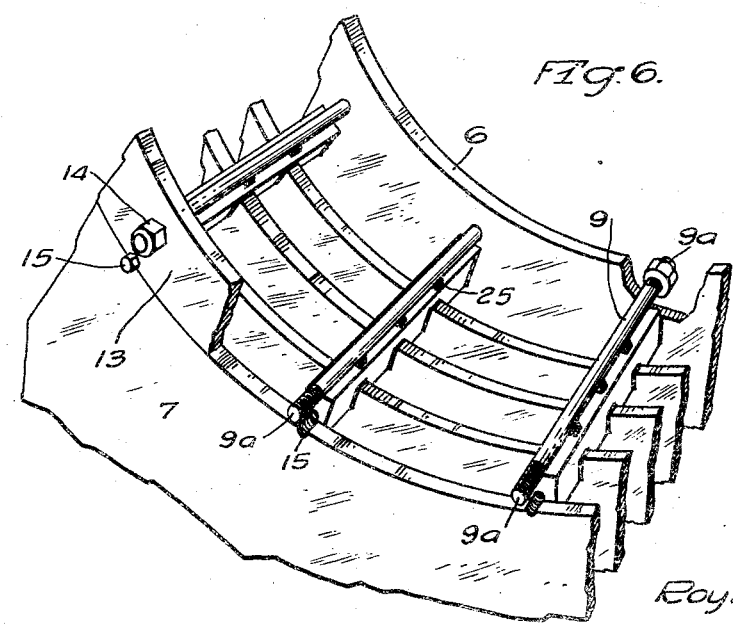
INVENTOR
Roy A. McCarty.
BY
ATTORNEY Patented Mar. 14, 1933

1,901,315

UNITED STATES PATENT OFFICE

ROY A. McCARTY, OF WILKINSBURG, PENNSYLVANIA, ASSIGNOR TO WESTINGHOUSE ELECTRIC & MANUFACTURING COMPANY, A CORPORATION OF PENNSYLVANIA

FABRICATED FRAME

Application filed May 27, 1929. Serial No. 366,481.

My invention relates to fabricated frame members for dynamo-electric machines and, more particularly, to means for holding the core laminations in face-to-face relation.

In the design and construction of fabricated frames, the main object that is kept in mind is to provide a strong and rigid structure with a minimum amount of material and, at the same time, one which requires minimum machining operations and may be quickly and easily assembled. A fulfillment of these requirements effects a great saving in the cost of constructing fabricated frames.

In a copending application by H. L. Barnholdt and J. L. Brown, Serial No. 278,396, filed May 17, 1928, now Patent No. 1,828,275, October 20, 1931, assigned to the Westinghouse Electric and Manufacturing Company, is described a satisfactory form of frame construction which is preferably utilized because of its simple arrangement of parts which are standard structural shapes. This construction was designed particularly with the object in mind of eliminating the machining or dovetailing operations as practiced prior thereto. Instead of machining a dovetail-shape groove in axially-disposed pieces upon which the core laminations are assembled, a rod or long bolt is welded along the edge of axial cross spacing pieces on which the core laminations are disposed in peripheral engagement. The core laminations are attached to the rods by a method described in a copending application of T. F. Noden, Serial No. 286,001, filed June 16, 1928, now Patent No. 1,795,882, March 10, 1931, also assigned to the Westinghouse Electric and Manufacturing Company, by which it is made possible to considerably decrease the time required for stacking the laminations on the rods. In fact, the latter invention overcomes an inherent disadvantage that was present in assembling laminations upon rods, namely, that it necessitated the disposing of the laminations over the ends of the rods and requiring that they be slid a considerable distance along the rods into their final positions; whereas, with the method described in the Noden application, the laminations may be assembled at points on the rods near to their final positions.

Having provided satisfactory means for holding the core laminations in a radial direction and knowing a favorable method for assembling core laminations upon rods, some means, that is likewise simple and satisfactory, is necessary for holding the laminations in face-to-face or axial relation.

It is the object of my invention to provide means for holding core laminations in face-to-face relation in fabricated frames, which is readily adaptable to the form of construction wherein core laminations are secured by peripheral engagement with rods, as described in the copending Barnholdt and Brown application.

It is another object of my invention to provide an effective holding means having a minimum amount of material.

In accordance with my invention, I allow the rods to which the core laminations are attached, to project beyond the end of the frame. A core-clamping ring is carried by the projecting ends of the rods which are threaded to carry clamping nuts for pressing the ring against the core laminations.

Further, in accordance with my invention, I provide a structure in which a single clamping ring is sufficient for holding the core laminations in face-to-face relation. This structure comprises, in general, annular plates which are disposed in spaced relation and carry core-supporting bolts on which core laminations are assembled. But the laminations are braced at one end by one of the annular plates itself, while, on the other end of the frame, a removable plate is placed over the threaded projecting ends of the core-supporting bolts and nested within, or in concentric relation to, the annular plate on the opposite end of the frame. For supporting cores of considerable length, the same general construction may be utilized but I prefer to further support the core-supporting rods in the frame at regions along the rods removed from the ends of the frame.

Figure 2:
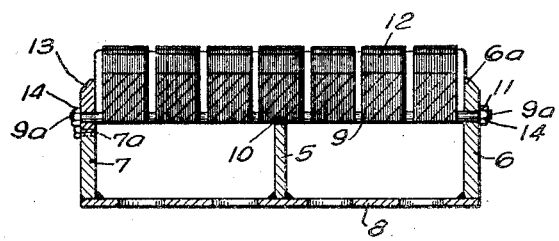

A better understanding of my invention may be had by reference to the following description, taken in connection with the accompanying drawings, in which;

Figure 1 is an elevational view, partly in section, of a fabricated frame of a dynamo-electric machine embodying my invention, Fig. 2 is a sectional view, taken on the line II—II of Fig. 1 which illustrates the preferred form of my invention, and, at the same time, shows a preferred simple method of further supporting the core-supporting rods at points removed from the outer ends of the frame, Fig. 3 is a sectional view of a stator frame for a machine of short core length where additional support for the core-supporting rods is unnecessary, and showing a pair of spaced annular plates and loose rods, Fig. 4 is an elevational view of a portion of a dynamo-electric-machine frame embodying another form of my invention, Fig. 5 is another elevational view of the same form shown in Fig. 4, taken on the line V—V of Fig. 4, and Fig. 6 is a perspective view of a fabricated frame showing my preferred form of invention, but showing another method of supporting the core-supporting rods removed from the ends of the frame for frames of extra core length.

In Figs. 1 and 2 is illustrated a fabricated stator frame comprising an annular plate 5 and annular end plates 6 and 7, all of them spaced apart, the annular plate 6 having its inner periphery 6a nearer to the machine axis than the inner periphery 7a of the plate 7, and arcuate-shaped plates 8 and 8a, bent about the outer edges of the annular plates for holding the plates in fixed spaced relation. Heretofore, arcuate plates have been utilized more for the purpose of providing additional rigidity and good appearance, but I have found that they may serve to carry all of the loading, and the cross pieces utilized heretofore are no longer necessary, thus making for simplicity of construction and effecting a saving in time required for assembly and of material.

A plurality of core-supporting rods or bolts 9 having threaded ends 9a are carried by the inner periphery of the plate 5, being set off therefrom, a small amount, by welded material 10 and by the right-hand end plate 6 within holes 11, for carrying the core laminations 12. The core laminations have recesses 12a in their outer peripheries, preferably cut-away as shown in the drawings, and being of the form described in the above-mentioned Noden application, and are stacked in face-to-face relation on the core-supporting rods 9.

By the novel structures of my invention, the core laminations are maintained in face-to-face relation by a removable plate 13 that is arranged to fit in concentric relation within the end plate 7, within its inner periphery 7a, over the threaded ends 9a of the rods 9, and are clamped against the core laminations by means of clamping nuts 14. A set of screws 15 may be utilized for properly centering the plate 13 within the plate 7.

Thus it may be seen that the annular plate 5 provides means for supporting the core-supporting rods 9 at regions removed from the ends of the frames. However, it is found that such amount of rod-supporting means is only necessary with machines having long cores and, this amount depends upon factors inherent in the requirements of the particular machine being constructed, such as torque and speed. For machines of shorter core length, the construction shown in Fig. 3, omitting the supporting means, is sufficient.

It is another feature of my invention, with the forms shown in Figs. 1, 2, 3 and 6, in that the removable plate 13 is obtained from a plate originally the size of plate 6, but cutting or burning with an electric arc to provide two concentric plates, such as 7 and 13.

In Figs. 4 and 5 is shown another form of my invention, though usually less to be desired because of the additional material and the fitting thereof, which is required, brought out above, but it does show a form particularly adaptable to long cores, where additional strengthening is required. This construction comprises annular plates 16 which are maintained in fixed spaced relation by cross pieces 16a disposed in their outer peripheries and by cross pieces 17 disposed in their inner peripheries. Core-supporting rods 18 having their ends 18a project beyond the end of the frame, are attached, at points along the inner edge of the inner cross pieces 17 and on which the core laminations 19 are stacked. The laminations are held in face-to-face relation by clamping rings which are carried by the projecting threaded ends of the rods and clamped against the laminations by means of clamping nuts 21. The clamping rings, however, upon being pressed against the laminations, engage the outer surfaces of the annular plates at the end of the frame.

In Fig. 6, is shown my preferred clamping arrangement of a single clamping ring nested within one of the end plates, but it shows more specifically an inner spacing member 25 for supporting the core-supporting rods at points removed from the ends of the frame. The spacing members 25 are preferably disposed in recesses in the inner periphery of the supporting annular plates intermediate to the two end plates but in abutting relation with the end plates. The spacers are rigidly welded within the recesses and to the end plates. This construction is more particularly utilized for machines having the longest core lengths where there is means for fastening the plates at their inner peripheries while, at the same time, provide supporting means for the core-supporting rods.

In the assembly, the fabricated frame may be laid upon its side, with the annular plate 6 on the bottom, which may then be utilized as a shelf on which the laminations are stacked.

I claim as my invention:

1. In a dynamo-electric machine, a stator frame comprising a pair of annular plates, means for rigidly holding said plates in fixed relation, said plates having equal outer diameters but one of said plates having an inner diameter somewhat less than the other, a movable concentric plate nested within the one of said plates having the larger inner diameter, a laminated core disposed between said concentric plate and the plate having the smaller inner diameter, longitudinally extending core-supporting rods extending through perforations in both of said annular plates for holding the laminations in fixed radial relation, and lamination-clamping means cooperating with said rods for clamping said concentric plate against said core to hold the laminations in fixed face-to-face relation.

2. In a dynamo-electric machine, a fabricated frame comprising at least three annular plates, arcuate shaped plates welded to the outer periphery of said annular plates for holding the same in fixed axially-spaced relation, core-supporting rods welded to the inner periphery of at least one annular plate which is disposed intermediate to annular plates at the two ends of said frame, said rods being supported at one end of the frame within holes of a fixed end plate, an axially-movable plate disposed at the opposite end nested within a fixed end plate of the other end, core laminations peripherally engaging said rods and disposed between said fixed end plate and said movable plate, and means for clamping said movable plate against the laminations, toward the fixed plate, for holding the laminations in face-to-face relation.

3. In a dynamo-electric machine, a fabricated stator frame comprising a plurality of ring-shaped members, a plurality of rib members disposed in the inner peripheries of said ring-shaped members for spacing said ring-shaped members, rods secured to the inner surfaces of said rib members, an end of each of said rods extending beyond the ring-shaped members, segmental core laminations engaging with said rods, and means cooperating with the ends of said rods for securing said laminations in face-to-face relation.

4. In a dynamo-electric machine, a fabricated stator frame comprising a plurality of annular-shaped plates, a plurality of rib spacing members for holding said plates in spaced relation, round rods tack-welded to the inner surfaces of the rib members at a plurality of points, each of said rods having a threaded end-extension, core laminations secured to said rods, and means cooperating with said end extensions for clamping the faces of said laminations together and comprising a removable end ring that is supported against the laminations by nuts.

In testimony whereof, I have hereunto subscribed my name this 23rd day of May, 1929.

ROY A. McCARTY.